United States Patent [19]
Tench et al.

[11] Patent Number: 5,903,382
[45] Date of Patent: May 11, 1999

[54] ELECTRODEPOSITION CELL WITH HIGH LIGHT TRANSMISSION

[75] Inventors: D. Morgan Tench; Leslie F. Warren, Jr., both of Camarillo, Calif.

[73] Assignee: Rockwell International Corporation, Costa Mesa, Calif.

[21] Appl. No.: 08/994,413

[22] Filed: Dec. 19, 1997

[51] Int. Cl.$^6$ .............................. G02F 1/155; G02F 1/153
[52] U.S. Cl. ........................ 359/265; 359/265; 359/271; 359/272; 359/275
[58] Field of Search .................................... 359/265, 266, 359/271, 272, 275

[56] References Cited

U.S. PATENT DOCUMENTS

| | | | |
|---|---|---|---|
| 4,768,865 | 9/1988 | Greenberg et al. | 359/266 |
| 4,902,108 | 2/1990 | Byker | 359/265 |
| 5,056,899 | 10/1991 | Warszawski | 359/265 |
| 5,161,048 | 11/1992 | Rukavina | 359/266 |
| 5,210,638 | 5/1993 | Eid et al. | 359/265 |
| 5,239,405 | 8/1993 | Varaprasad et al. | 359/265 |
| 5,293,546 | 3/1994 | Tadros et al. | 359/266 |
| 5,294,376 | 3/1994 | Byker | 359/265 |
| 5,332,530 | 7/1994 | Eid et al. | 359/265 |
| 5,472,643 | 12/1995 | Varaprasad et al. | 359/265 |
| 5,671,082 | 9/1997 | Babinec | 359/270 |
| 5,760,945 | 6/1998 | Coleman | 359/270 |
| 5,764,401 | 6/1998 | Udaka et al. | 359/270 |

FOREIGN PATENT DOCUMENTS

| | | |
|---|---|---|
| 0 652 463 A1 | 5/1995 | European Pat. Off. . |
| 2 504 290 | 10/1982 | France . |
| 328017 | 4/1930 | United Kingdom . |

OTHER PUBLICATIONS

Camlibel, et al., Applied Physics Letters, vol. 33(9), pp. 793–794 (Nov. 1, 1978).

Duchene, et al., IEEE Transactions on Electron Devices, vol. ED–26, No. 8, pp. 1243–1245 (Aug. 1979).

Goldner, Solid State Ionics, vol. 28–30, pp. 1715–1721 (1988).

Howard, et al., Proceedings of Symposium on Electrochemically Deposited Thin Films, San Diego, The Electrochemical Society Proceedings vol. 93–26, pp. 353–361 (1993).

Howard, et al., Solar Energy Materials and Solar Cells, vol. 39, pp. 309–316 (1995).

Lampert, Circuits and Devices, vol. 8(2), pp. 19–26 (Mar. 1992).

Mantell, et al., Journal of the Electrochemical Society, vol. 109, No. 10, pp. 992–993 (Oct. 1962).

Stocker, et al., Journal of the Electrochemical Society, vol. 128, No. 4, pp. 746–748 (Apr. 1981).

(List continued on next page.)

*Primary Examiner*—Georgia Epps
*Assistant Examiner*—Evelyn A. Lester
*Attorney, Agent, or Firm*—James P. O'Shaughnessy; John J. Deinken

[57] ABSTRACT

An electrochemical device includes a transparent first electrode and a second electrode distributed in localized areas. An electrolytic solution, disposed between and in electrical contact with the first and second electrodes, contains ions of a metal which can electrodeposit on the first and second electrodes. Atoms of this metal are deposited on the first or the second electrode. A negative electrical potential applied to the first electrode causes deposited metal to be dissolved from the second electrode into the electrolytic solution and to be electrodeposited from the solution onto the first electrode, thereby affecting the propagation of electromagnetic radiation through the device. Conversely, a positive electrical potential applied to the first electrode causes deposited metal to be dissolved from the first electrode and electrodeposited from the solution onto the second electrode, thereby increasing the transmissivity of the device.

33 Claims, 4 Drawing Sheets

OTHER PUBLICATIONS

Van Uitert, et al., Applied Physics Letters, vol. 34, No. 3, pp. 232–234 (Feb. 1, 1979).

Zaromb, Journal of the Electrochemical Society, vol. 109, No. 10, pp. 903–912 (Oct. 1962).

Zaromb, Journal of the Electrochemical Society, vol. 109, No. 10, pp. 912–918 (Oct. 1962).

Ziegler, et al., Proceedings of Second Symposium on Electrochemically Deposited Thin Films, Miami, The Electrochemical Society Proceedings vol. 94–31, pp. 23–32 (M. Paunovic, ed. Oct. 1994).

Ziegler, et al., Solar Energy Materials and Solar Cells, vol. 39, pp. 317–331 (1995).

Zurer, Chemical & Engineering News, p. 10 (Oct. 21, 1996).

ELECTRODEPOSITION CELL WITH HIGH LIGHT TRANSMISSION

BACKGROUND OF THE INVENTION

This invention is concerned with devices having controllable transmittance.

Sunlight transmitted through windows in buildings and transportation vehicles can generate heat (via the greenhouse effect) that creates an uncomfortable environment and increases air conditioning requirements and costs. Current approaches to providing "smart windows" with adjustable transmission for use in various sunlight conditions involve the use of light absorbing materials. These approaches are only partially effective, since the window itself is heated and because these devices, such as electrochromic devices, are relatively expensive and exhibit limited durability and cycle life. Certain liquid crystal-based window systems switch between transmissive and opaque/scattering states, but these systems require substantial voltages to maintain the transparent state. There is an important need for an inexpensive, durable low voltage device with variable transmissivity.

In prior art attempts to exploit reversible electrodeposition of a metal for light modulation, the deposits obtained on transparent substrates presented a rough and black, gray, or sometimes colored appearance (typical of finely-divided metals) and exhibited poor reflectivity and high light absorbance, especially when thick. Such deposits have been investigated for display applications involving reflectance from the background, with white pigments often being added to improve contrast. Warszawski (U.S. Pat. No. 5,056,899), which is concerned with displays, teaches that reversible metal electrodeposition is most appropriate for display applications, since significant disadvantages for transmission devices were given (e.g., the possibility of metal deposition at the counter electrode). Such teachings imply that the application of reversible metal deposition to smart windows must involve light absorption by the finely divided electrodeposited metal, which would result in heating of the device itself and thus the space inside. The prior art literature also teaches that, for transmission-type devices, reversible metal electrodeposition requires the use of an auxiliary counter electrode reaction; otherwise, metal would plate on the counter electrode as the deposit was deplated from the working electrode.

Electrolytes described in the prior art literature contain auxiliary redox species (e.g., bromide, iodide, or chloride) that are oxidized (e.g., to bromine, iodine, or chlorine) at the counter electrode during metal deposition, introducing chemistry-related instabilities during long term operation and greatly reducing the memory effect by causing dissolution of the metal deposit on open circuit, e.g., $2Ag^0 + Br_2 \rightarrow 2AgBr$. In most cases, this auxiliary redox process hinders metal deposition at the counter electrode during erasure, introducing a threshold voltage that is desirable for display applications. This auxiliary redox process represents a significant side reaction even when metal plating/deplating occurs at the counter electrode and a threshold voltage is not observed. See, e.g., Warszawski, Columns 3–4 (when copper or nickel were present in the counter electrode paste) and Duchene, et al., Electrolytic Display, IEEE Transactions on Electron Devices, Volume ED-26, Number 8, Pages 1243–1245 (August 1979); French Patent No. 2,504,290 (Oct. 22, 1982). High switching voltages of at least 1 V were used for all the electrodeposition devices which have been found in the patent and literature prior art.

Warszawski teaches that the use of a grid counter electrode would give a less uniform deposit since deposition on the transparent working electrode is highly localized in the vicinity of the counter electrode grid lines (a consequence of the very thin film of gel electrolyte used). Warszawski also teaches the use of an aqueous gel electrolyte to minimize sensitivity to atmospheric contaminants and to avoid the necessity of having a leak tight seal. Such electrolytes, however, have much more limited temperature and voltage operating ranges compared with organic-based electrolytes with high boiling solvents.

Prior art literature teaches that the memory effect is temporary. This is a consequence of the occurrence of a counter electrode reaction other than metal plating/deplating. The energetic oxidation products generated at the counter electrode can cause dissolution of the metal deposit on the working electrode either chemically on open circuit (slow) or electrochemically during short circuit (fast).

Nishikitani et al. (European Patent No. 0,618,477) teaches that the counter electrode in electrochromic devices for smart window applications can be a metal grid which is substantially transparent. Since no metal electrodeposition occurs in electrochromic devices, however, the grid in this case is used to provide a transparent electrode, not to maintain transparency by localizing metal deposition. In addition, to provide adequate electrical capacity for electrochromic devices, Nishikitani's grid would need a very high surface area (at least 10 $m^2/g$ and preferably 50 to 5,000 $m^2/g$) and a line width of 50 to 5,000 $\mu m$; alternatively, a plurality of dots on a conducting substrate can be used, but the dots must contain fine particles having electrical capacitance of not less than 1 farad/g.

SUMMARY OF THE INVENTION

The electrodeposition device of this invention permits efficient and precise control over the propagation of visible light and other electromagnetic radiation. The device includes a transparent first electrode, with a second electrode distributed in localized areas. An electrolytic solution is disposed between the first and second electrodes such that ions of a metal which can electrodeposit on the electrodes are dissolved in the electrolytic solution. A plurality of atoms of the metal are deposited on either the first or second electrode.

When a negative electrical potential is applied to the first electrode relative to the second electrode, the applied potential tends to cause deposited metal to be dissolved from the second electrode into the electrolytic solution and to be electrodeposited from the solution onto the first electrode, thereby impeding the propagation of the radiation through the device. Conversely, when the polarity is reversed and a positive electrical potential is applied to the first electrode relative to the second electrode, the applied potential tends to cause deposited metal to be dissolved from the first electrode and electrodeposited from the solution onto the second electrode, thereby increasing the transmissivity of the device.

In various embodiments, the second electrode may be made substantially transparent to the radiation and may be distributed so as to block the radiation in a desired pattern, such as, for example, a graphic design. The second electrode may be a continuous electrical conductor, such as an electrochemically stable conductive mesh pattern on a glass substrate, or a discontinuous electrical conductor, such as a dot matrix pattern on a transparent conducting film on glass. An underlayer may be provided between the second electrode and the second substrate to improve adhesion.

The first electrode may be disposed uniformly on a first substrate, or may be disposed in a pattern. The electrolytic solution may include a gelling agent to form an aqueous or a non-aqueous gel electrolyte.

DESCRIPTION OF THE INVENTION

Figure 1:
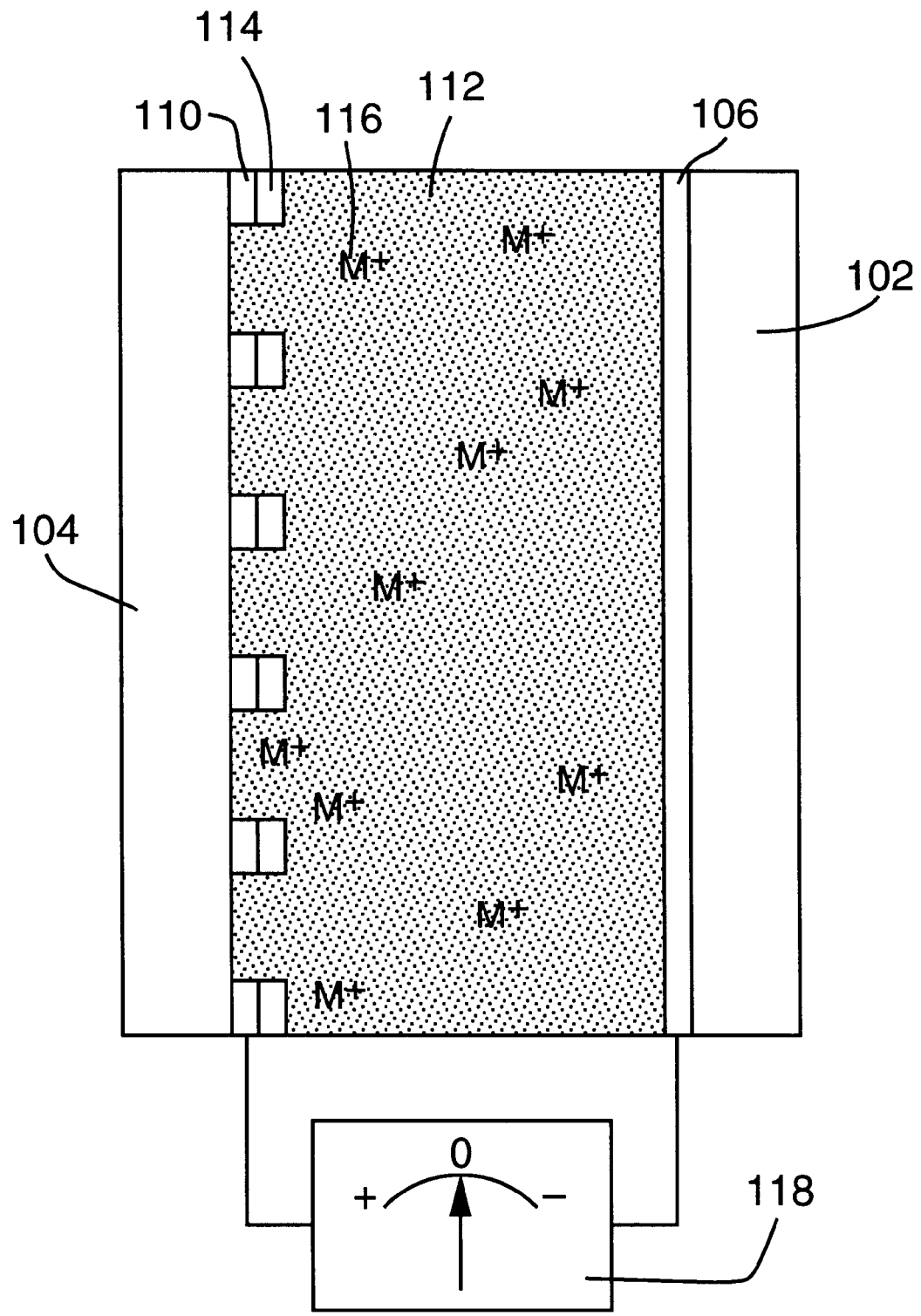
FIG. 1 is a cross sectional view depicting the general design of an electrodeposition device constructed according to the invention.

FIG. 1 is a cross sectional view depicting the general design of an electrochemical device constructed according to our invention (some dimensions, particularly layer thicknesses, are disproportionate in the drawings in order to more effectively illustrate the structure and function of the invention). The device, which allows precise, reversible control over the transmission of electromagnetic radiation, includes first and second substrates 102 and 104 which are substantially transparent to the radiation to be controlled. An electrically conducting and electrochemically stable film 106, which is also substantially transparent, is deposited on the first substrate. The film 106 functions as a first electrode. A second electrochemically stable electrode 110 is deposited on the second substrate. Unlike the first electrode 106, however, the second electrode 110 is applied in a special configuration. Rather than being deposited in a uniform layer, the second electrode is distributed in localized areas on the second substrate.

An electrolytic solution 112 is located between and in electrical contact with the electrodes 106 and 110. In the configuration depicted by FIG. 1, the device is initially charged by depositing a metallic layer 114 on the locally distributed electrode 110, i.e., the layer 114 is deposited on the electrode 110 prior to assembly of the device. As those skilled in the art will appreciate, and as further explained in the discussion below regarding the operation of the device, this metallic layer may be, alternatively, initially deposited on the electrode 110, on the electrode 106, or divided between a partial deposit on the electrode 106 and a partial deposit on the electrode 110. The amount of metal in this initially deposited layer or layers establishes the maximum amount of metal which will be available for deposit, as explained in more detail below, to control the transmittance of the device. Metal ions 116, which contain the same metal atoms as the layer 114, are dissolved within the electrolytic solution 112 such that the metal atoms in solution can be reversibly electrodeposited on and electrodissolved from the first and second electrodes.

The device is intended for use in conjunction with a source of electrical potential 118 which has a reversible polarity and an adjustable potential value. The source 118 is connected between the first and second electrodes 106 and 110. When a negative electrical potential is applied to the first electrode 106 relative to the second electrode 110, metal 114 deposited on the second electrode 110 will tend to be dissolved from the second electrode into the electrolytic solution 112, while metal ions 116 in the solution will tend to be electrodeposited from the solution onto the first electrode 106.

When the polarity of the applied potential is reversed, such that a positive potential is applied to the first electrode 106 relative to the second electrode 110, deposited metal will tend to be dissolved from the first electrode into the solution 112 and dissolved metal will tend to be electrodeposited from the solution onto the second electrode.

The amount of deposited metal which remains on the first electrode will determine the impediment which the device presents to the radiation. Since the second electrode is distributed in localized areas, metal deposited on the second electrode will not substantially impede the transmission of radiation through the device, much like the scene outside a window can be easily viewed through a window screen made of a grid of wire or fiberglass. The process is reversible and may be maintained at virtually any point between substantially complete deposition on and substantially complete erasure from the first electrode. Thus the device may be adjusted to any transmissive value from approximately 0% to approximately 100%.

Figure 2:
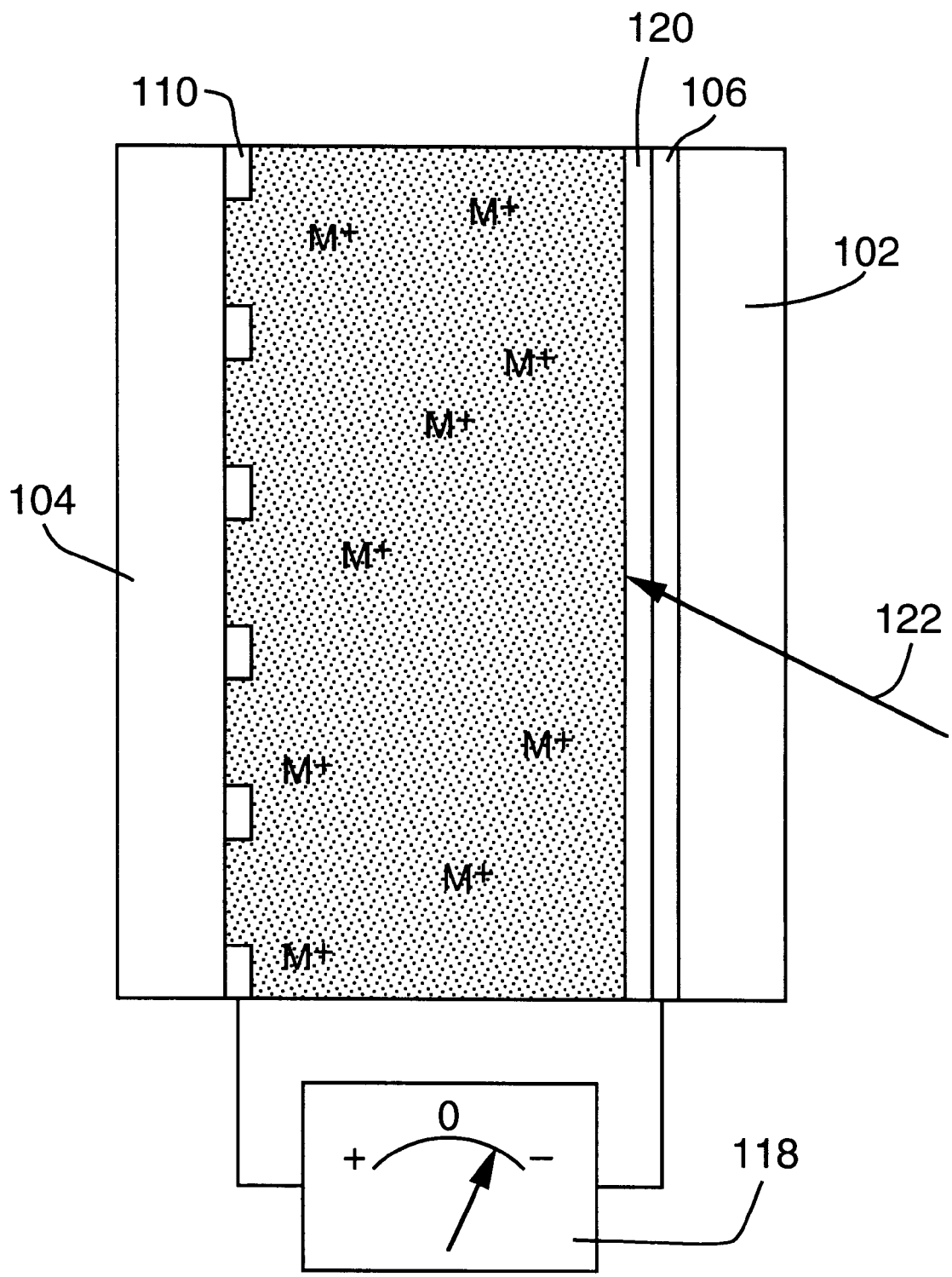
FIG. 2 is a cross sectional view similar to FIG. 1, but illustrating the configuration of the device when sufficient negative electrical potential has been applied to the first electrode relative to the second electrode to cause substantial quantities of the metal to deposit onto the first electrode.

FIG. 2 is a cross sectional view similar to FIG. 1, but illustrating the performance of the device when sufficient negative electrical potential has been applied to the first electrode relative to the second electrode for a sufficient period of time to cause a substantial layer of the metal to deposit onto the first electrode. In this condition, a layer 120, created by the deposited metal, will tend to impede the transmission of radiation, illustrated by the light beam 122, which impinges on the device, either by reflection or by absorption, as explained further below.

Figure 3:
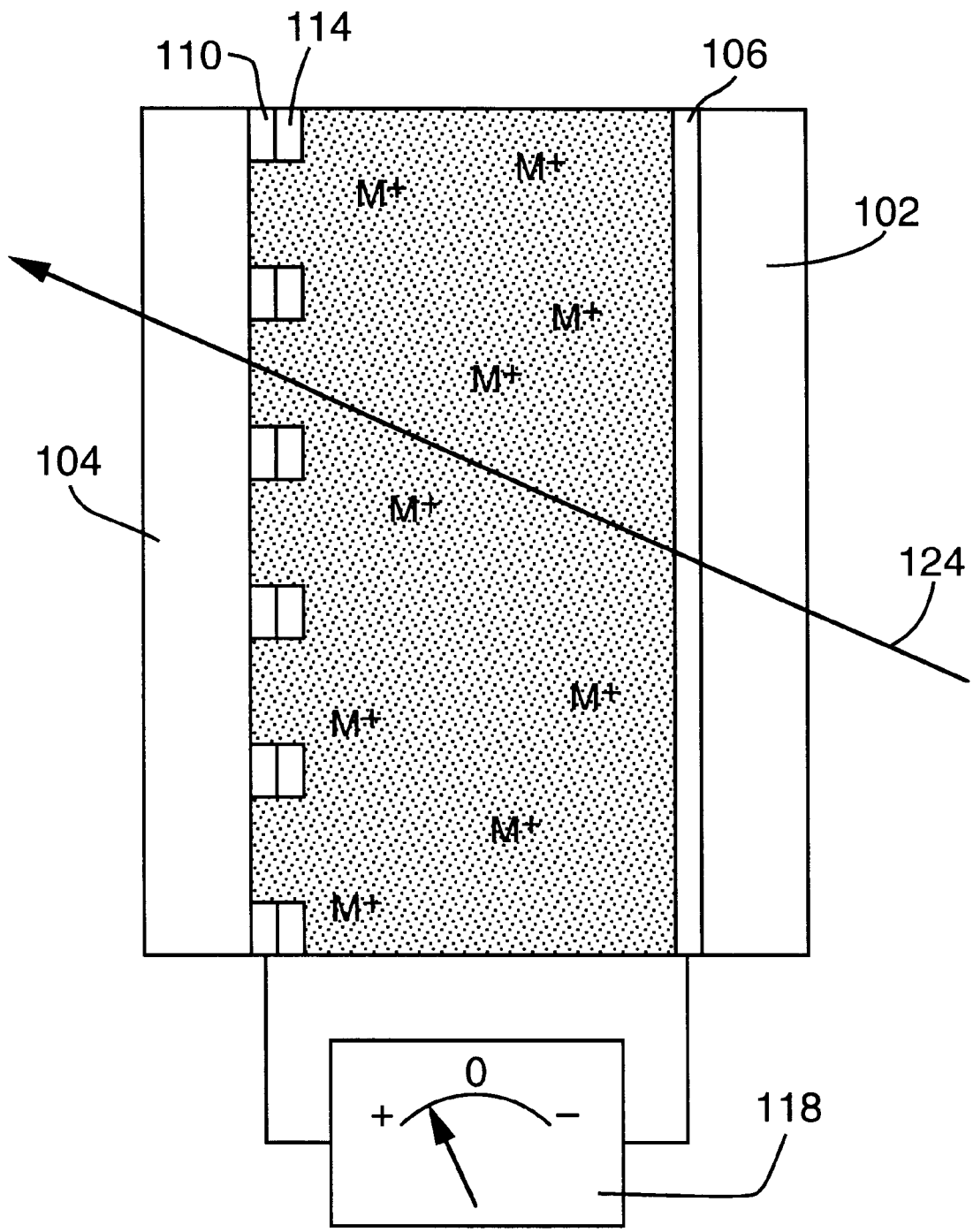
FIG. 3 is a cross sectional view similar to FIGS. 1 and 2, but depicting the status of the device when sufficient positive electrical potential has been applied to the first electrode relative to the second electrode to cause substantially all of the metal to deposit in distributed regions on the second electrode.

FIG. 3 is a cross sectional view similar to FIGS. 1 and 2, but illustrating the behavior of the device when sufficient positive electrical potential has been applied to the first electrode relative to the second electrode for a sufficient period of time to cause substantially all of the metal to dissolve from the first electrode and to deposit as the distributed metallic layer 114 on the second electrode. In this condition, the mirror will impose a minimal impediment to incoming radiation, thereby allowing substantially all such incoming radiation to be transmitted through the device, as illustrated by the light beam 124.

Figure 4:
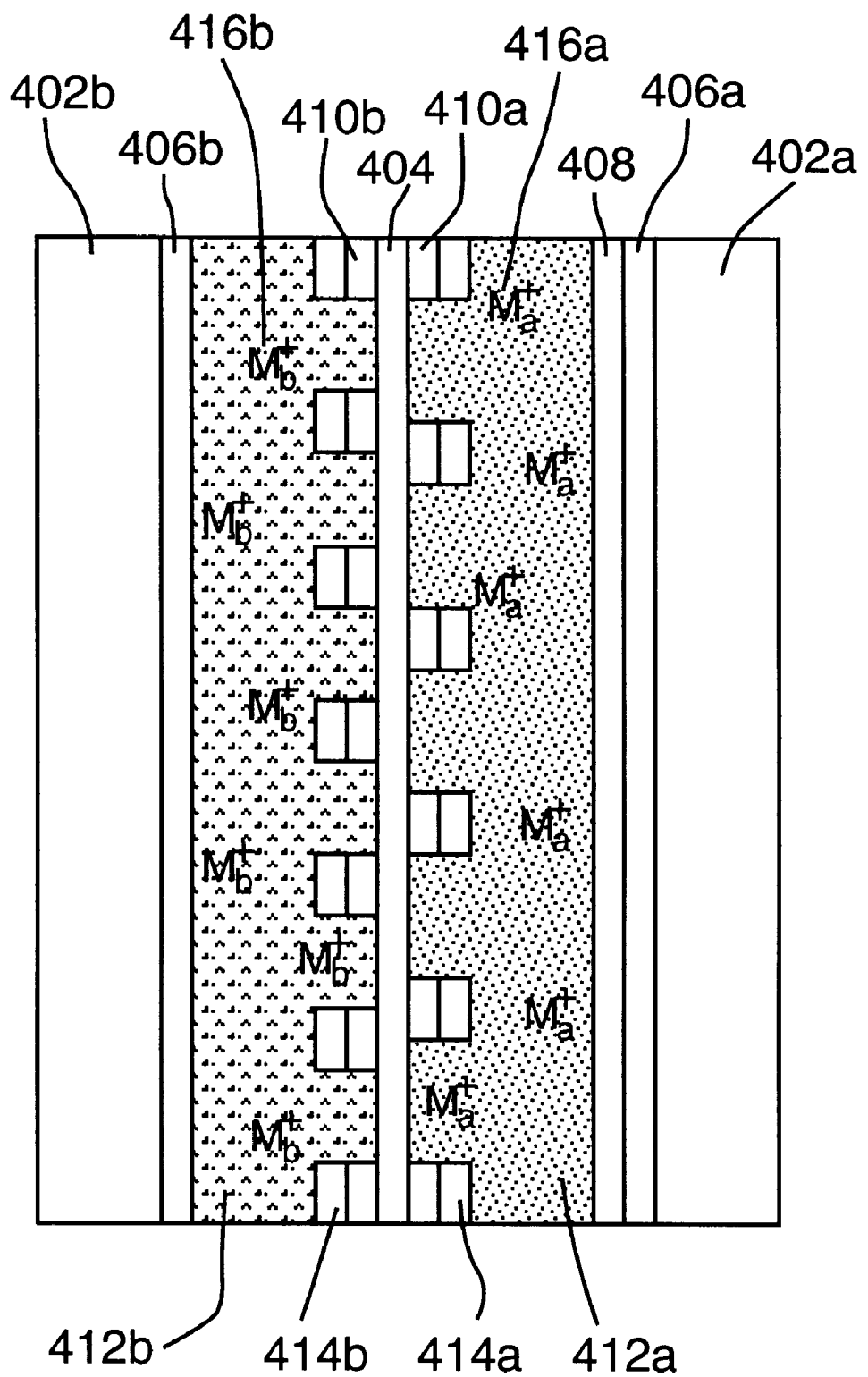
FIG. 4 is a cross sectional view of a curtained version of the device.

FIG. 4 is a cross sectional view of a "curtained" version of the device which is capable of forming both a reflective mirror layer and a black, absorbing curtain layer. In this embodiment, an electrically conducting transparent film 406a is deposited on a transparent substrate 402a, while another electrically conducting transparent film 406b is deposited on a transparent substrate 402b. Between these components, a substrate 404 has a locally distributed electrode 410a deposited on one side, with a similar locally distributed electrode 410b deposited on the other side. As explained above in connection with the embodiment depicted in FIGS. 1–3, the device is initially charged with metallic layers 114a and 114b deposited on electrodes 410a and 410b, respectively. Electrolyte solution 412a is positioned between and in electrical contact with the electrodes 406a and 410a, while an electrolyte solution 412b is positioned between and in electrical contact with the electrodes 406b and 410b. Metal ions 416a are dissolved within the solution 412a, while metal ions 416b are dissolved within the solution 412b. The solutions 412a and 412b may be the same or different, but should typically be chosen to optimize the operation of the respective sides of the device, as explained in more detail below. Similarly, the ions 416a and 416b may be identical or different, depending on the structural and operating parameters chosen for each side of the device. A surface modification layer 408 on the electrode 406a facilitates nucleation of electrodeposited metal on the electrode in a substantially uniform mirror layer.

A negative electrical potential applied to the electrode 406a, relative to the electrode 410a, will cause metal ions to deposit in a substantially uniform layer on the surface modification layer 408, forming a mirror surface which will reflect light passing through the device from the right side of FIG. 4. A negative electrical potential applied to the electrode 406b, relative to the electrode 410b, will cause metal ions to deposit on the electrode 406b. Because of the design parameters chosen for this electrode, including the absence of a surface modification layer on the electrode 410b, however, the latter deposit will tend to be finely divided and porous, so that it appears black or gray. This deposit will thus tend to block the transmission of light through the device from the left by absorption. This embodiment thus provides the user with the option to employ both absorbing and reflecting layers, each of which may be adjusted for the amount of absorption or reflection, respectively. One use for such a device would be in the sunroof of an automobile. When the device is configured to form a substantially reflecting mirror surface, the mirror surface will tend to reflect both light striking the surface from outside of the vehicle as well as from the interior of the vehicle. Since such a reflective panel might be undesirable on the interior ceiling of the automobile, the curtain layer can be activated so that the sunroof would appear as a darkened non-reflective panel from the interior. The curtained embodiment may also be used where heating is desired, e.g., by means of heat radiated and/or conducted as a result of the light absorbed by the layer.

Fabrication of a Preferred Embodiment

The preferred first electrode utilizes a glass or plastic substrate which is uniformly coated on one side with a transparent, high conductivity ($\leq 10$ Ω/square) ITO (indium tin oxide) film. An electrical bus connection is formed around the perimeter of the ITO coating with conducting Ag epoxy or a vacuum evaporated metal strip.

The preferred second electrode includes an adherent, electrochemically inert metal grid pattern, e.g., Ti/Au or Cr/Au, deposited on a glass or plastic substrate via vacuum deposition. A square, electrically continuous grid pattern with 25 $\mu$m wide lines 500 $\mu$m apart will provide ~90% light transmission. The grid is electrically connected through a Ag epoxy or evaporated metal bus around the perimeter of the substrate. Prior to cell assembly, the grid is plated with a quantity of metal, an excess being preferable. (Alternatively, the first electrode can be plated in this fashion).

The preferred electrolyte is an optically clear gel electrolyte with the following components:

1. An appropriate solvent with a low freezing point, high boiling point, and high dielectric constant, e.g., propylene carbonate (f.p. −49° C., b.p. 241° C.), or γ-butyrolactone (f.p. −43° C., b.p. 202° C.). These solvents have large windows of electrochemical potential stability and are used in commercial batteries and electrolytic capacitors.
2. A supporting electrolyte salt, such as a lithium salt with a strongly acidic anion, e.g., perchlorate, hexafluorophosphate, trifluoromethanesulfonate, bistrifluoromethanesulfonimide, etc., to provide conductivity to the electrolyte. Electrolytes of such lithium salts (~1M) in a propylene carbonate (PC) or γ-butyrolactone (GBL) solvent are highly conductive and are used in advanced batteries and capacitors. Other soluble supporting electrolyte salts, e.g., containing other alkali metal ions or tetraalkylammonium ions, can also be used.
3. An active metal salt or complex which is soluble (~0.1–1M), and thermally/photolytically stable in the above lithium salt electrolyte, to enable the reversible plating of the metal layer onto the first and second electrodes. This salt can be based on various metal ions, e.g., silver(I), copper(I), bismuth(III), or other metal systems. Examples include silver perchlorate and silver trifluoromethanesulfonate.
4. An additive to complex the metal ions, which may be required by some systems to stabilize them with respect to thermal or photolytic decomposition to the elemental metals and increase the voltage required for electrodeposition (thus improving the plating quality). For example, Ag(I) and Cu(I) can be stabilized by nitriles, amines, phosphines, sulfur donors, etc., e.g. [Cu(nitrile)$_4$]CF$_3$SO$_3$. Additives may also be desirable for preventing dendrite growth, which can lead to electrical shorting.
5. An electrochemically inert polymer stiffener, e.g., polymethylmethacrylate (PMMA) or polyacrylonitrile (PAN), which dissolves in the liquid electrolyte to form a transparent plastic-like gel at room temperature. With an appropriate amount of stiffener, the resulting gel electrolyte can retain the conductivity of the liquid electrolyte, yet be cut and applied as a "solid state" component. A typical gel electrolyte composition which is free-standing at room temperature contains about 6% (by weight) lithium salt (~0.5–1M), 4% silver salt (~0.1–0.5M), 20% PMMA, and 70% solvent (e.g., PC+benzonitrile stabilizer). This composition may be cast onto a glass sheet (at elevated temperature or with excess volatile solvent), allowed to cool or evaporate to the desired level, peeled off of the glass, and then sandwiched between the two electrodes.

The electrochemical device of this invention can be fabricated using a liquid (without the polymer stiffener) or a gel electrolyte, with the latter being preferred. In both cases, the two electrodes may be separated by a gasket or O-ring of appropriate chemical compatibility (e.g., silicone rubber). The preferred electrode separation is about 0.5–3.0 mm and contains either the liquid or gelled electrolyte. Electrical contact is made to the metal/silver epoxy bus on each electrode and connected to a voltage source for switching.

EXAMPLES

1. An electrolyte was prepared containing 1.35 g silver perchlorate (~0.2M), 1.91 g lithium perchlorate (~0.6M), and 7.62 g PMMA in 7.5 ml BN and 22.5 ml PC. The first electrode was a 7.6 cm diameter glass disk with a 10 Ω/square ITO coating and a 15 Å titanium/40 Å gold flash. (The titanium underlayer enhanced the adhesion of the gold to the ITO). The second electrode was fashioned from a glass substrate with a fine evaporated Ti/Au ~1,000 Å square grid pattern with 25 $\mu$m thick lines separated by 500 $\mu$m spacings; 5 coulombs (~5.6 mg) of silver were electroplated onto the grid. Electrical contacts were made to both electrodes via peripheral strips of silver epoxy which were located outside of and not in contact with the electrolyte. Cell fabrication was carried out by sandwiching the electrolyte (which flowed slowly at 100° C.) between the electrodes, using a 2.4 mm thick silicone rubber O-ring spacer/seal, and clamping the assembly together in a circular frame; excess electrolyte was rinsed away with acetone. The cell was switched at ±0.3 V between transparency and a mirror.

2. An example of a system which forms a mirror deposit using an ITO first electrode without a nucleating layer is based on a silver cyanide electrolyte composition: 15 g/L $AgNO_3$, 23.5 g KCN, 15 g $K_2CO_3$, in 400 ml of water. A mirror deposit forms on the ITO second electrode when biased at $-0.6V$ versus $Ag/Ag(CN)_2$. The silver erases upon biasing at $+0.6V$.

3. If a mirror deposit is not required, one could construct a device employing a locally distributed electrode and an electrolyte, without a nucleating layer. Such a device can be designed to yield a finely divided, black or gray deposit. The aqueous bismuth electrolyte reported by Howard and Ziegler (Solar Energy Materials and Solar Cells, Volume 39, Pages 309–316 (1995)), for example, provides such a deposit which will tend to absorb rather than reflect light propagating through the device.

Features of the Invention

It may be desirable for some applications to use a second electrode with an inert metal pattern which is not electrically continuous. Since the overvoltage for metal deposition on conducting oxides like ITO is much greater than on a metal, inert metal islands distributed on a conducting oxide film, which lowers the sheet resistance, will behave like localized isolated electrodes with respect to the metal deposition. In this embodiment of the invention, current is conducted through the conducting substrate film (e.g., ITO) to the metallic islands without causing metal electrodeposition elsewhere. The voltage is chosen so that the metal electrodeposits only on the isolated metal sites, although current to the sites is carried by the underlying conducting oxide film. A second electrode pattern could thus be chosen to be less perceptible to the eye, e.g., a fine dot matrix. Conversely, a pattern could be selected to be intentionally visible for aesthetic effects, e.g., an array patterned to represent an image.

The second electrode, which can be in the form of a fine inert metal mesh, like a window screen, enables most of the light to be transmitted. Such a fine grid, which localizes the metal deposit for maximum light transmission, permits the use of the same reversible electrochemical reaction (metal electrodeposition/dissolution) at both electrodes, greatly simplifying the overall system, eliminating the need for a cell separator, and avoiding high voltages. Thus, the system involves a net reversible transfer of the same metal from a plated layer at one electrode to a distributed localized state at the other, with no net chemical change in the overall system. Very little voltage is required for switching and it is not necessary to maintain an applied voltage to preserve a given switched state. This is attained by excluding redox species other than the metal ions to be deposited from the electrolyte and by limiting the operating voltage so that solvent/counterion breakdown is thermodynamically not possible. A fine grid counter electrode localizes the second electrode deposit for maximum light transmission.

No highly energetic species are produced at the electrodes. As a result, a particular switched state is maintained indefinitely at open circuit.

The device of this invention requires neither a high electrode surface area nor high electrical capacity, so that metal traces (having high electrical conductivity) can be used and much greater window transparency can be attained via finer line widths, greater spacing, or smaller dot diameters.

High light transmission through the second electrode is attained via a fine electrochemically stable metal mesh pattern (deposited on glass or plastic) to localize the metal deposit.

The electrochemical device is operated well within the electrolyte stability region, so that excessive metal plating or deplating is not harmful. In fact, the device is self-limiting for both electrodes when biased within the voltage stability region, since the current will practically cease when the deposited metal is depleted at either electrode. By limiting the amount of metal deposited on the second electrode prior to cell assembly, overplating of the first electrode under a protracted applied voltage is precluded.

No cell separator is needed since the same redox couple (metal deposition/dissolution) involving a solid product is used at both electrodes and side reactions are avoided.

A wide temperature operating range is obtained by using electrolytes based on high boiling organic solvents, e.g., propylene carbonate, sulfolane, γ-butyrolactone, tetraglyme, etc.). Use of mixtures of these solvents can extend the temperature range to lower operating temperatures.

Use of a "solid state" gel electrolyte which incorporates an electrochemically inert polymer stiffener facilitates device fabrication and minimizes sensitivity to atmospheric contamination by preventing convectional transport (diffusion is a very slow process) as well as cell leakage.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. An electrochemical device for reversibly controlling the propagation of electromagnetic radiation, comprising:

a first electrode which is substantially transparent to the radiation;

a second electrode which is distributed in localized areas;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal deposited on either the first or the second electrode, such that a negative electrical potential applied to the first electrode relative to the second electrode tends to cause deposited metal to be dissolved from the second electrode into the solution and to be electrodeposited from the solution onto the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the propagation of the radiation through the device.

2. The device of claim 1, wherein the second electrode is substantially transparent to the radiation.

3. The device of claim 1, wherein the second electrode is distributed so as to block the radiation in a desired pattern.

4. The device of claim 1, further comprising:
a first substrate which is substantially transparent to the radiation, the first electrode being disposed on the first substrate; and
a second substrate which is substantially transparent to the radiation, the second electrode being distributed in localized areas on the second substrate.

5. The device of claim 4, wherein
the second substrate is an electrically insulating substrate and
wherein the second electrode is a continuous electrical conductor.

6. The device of claim 5, wherein the second electrode is arranged in a conductive mesh pattern.

7. The device of claim 4, wherein the second substrate is an electrically conducting substrate and the second electrode is a discontinuous electrical conductor having a relatively low overvoltage for electrodeposition of the metal relative to the second substrate.

8. The device of claim 7, wherein the second electrode is arranged in a dot matrix pattern.

9. The device of claim 5, wherein the second electrode is an electrically continuous grid of an electrochemically stable metal deposited on the second substrate.

10. The device of claim 9, wherein the electrochemically stable metal of the second electrode grid includes at least one metal selected from the group consisting of Au, Cr, Ir, Ni, Os, Pd, Pt, Re, Rh, Ru and stainless steel.

11. The device of claim 4, further comprising an underlayer between the second electrode and the second substrate to improve adhesion between the second electrode and the second substrate.

12. The device of claim 11, wherein the underlayer includes at least one metal selected from the group consisting of chromium, hafnium, molybdenum, nickel, titanium, tungsten and zirconium.

13. The device of claim 4, wherein the first electrode is disposed uniformly on the first substrate.

14. The device of claim 4, wherein the first electrode is disposed in a pattern on the first substrate.

15. The device of claim 4, wherein the first electrode is an electrically conductive oxide coating deposited on the first substrate.

16. The device of claim 15, wherein the electrically conductive oxide coating is selected from the group consisting of aluminum (doped) zinc oxide, antimony (doped) tin oxide, fluorine (doped) tin oxide, indium oxide, and indium tin oxide.

17. The device of claim 4, wherein the first and second substrates are glass.

18. The device of claim 4, wherein the first and second substrates are a plastic.

19. The device of claim 18, wherein the plastic first and second substrates are selected from the group consisting of polycarbonate resins and polyurethane resins.

20. The device of claim 4, wherein the electrolytic solution is a solution containing water.

21. The device of claim 20 wherein the electrolytic solution further comprises a gelling agent to form a gel electrolyte.

22. The device of claim 21, wherein the gelling agent is selected from the group consisting of gelatin, polyacrylamide, polyacrylates derived from polyacrylic acid, polyvinylalcohol, polyvinylpyrrolidine, cellulose derivatives, and finely divided silica.

23. The device of claim 4, wherein the electrolytic solution is a non-aqueous solution.

24. The device of claim 23, wherein the electrolytic solution further comprises an electrochemically inert gelling agent to form a non-aqueous gel electrolyte.

25. The device of claim 24, wherein the gelling agent is selected from the group consisting of polyacrylamide, polyacrylic acid, polyacrylonitrile, polycarbonate resin, polymethylmethacrylate, polypropylenecarbonate, polyvinylalcohol, polyvinylidinefluoride, polyvinylpyrrolidine, and finely divided silica.

26. The device of claim 4, wherein the metal ions are selected from the group consisting of $Ag^+$, $Bi^{3+}$, $Cu^{+/2+}$, $Cd^{2+}$, $Hg^{2+}$, $In^{3+}$, $Pb^{2+}$, $Sb^{3+}$, $Tl^{+/3+}$, and $Zn^{2+}$.

27. The device of claim 4, wherein the electrolytic solution is a solvent selected from the group consisting of benzonitrile, dimethylcarbonate, dimethylsulfoxide, ethylene carbonate, ethylene glycol, $\gamma$-butyrolactone, glycerol, propylene carbonate, sulfolane, and tetraglyme.

28. The device of claim 4, wherein the electrolytic solution further comprises a complexing species for chemically stabilizing the electrodepositable metal ion in solution, thereby facilitating the electrodeposition of a substantially uniform layer of the metal on the first electrode.

29. The device of claim 28, wherein the complexing species is selected from the group consisting of aromatic and olefinic compounds, aromatic nitrites, benzonitrile, aromatic heterocyclic amines, aromatic heterocyclic sulfides, quinoline, sulfides, aliphatic amines, aromatic amines, organo-nitriles, organo-phosphines, organo-thiols, organo-sulfides, halide ions, pseudohalide ions, and polyhydric alcohols.

30. An electrochemical device for reversibly controlling the propagation of electromagnetic radiation, comprising:
a first substrate which is substantially transparent to the radiation;
a first electrode which is disposed on the first substrate and which is substantially transparent to the radiation;
a second substrate which is substantially transparent to the radiation;
a second electrode which is distributed in localized areas on the second substrate;
an electrolytic solution disposed between and in electrical contact with the first and second electrodes;
a plurality of ions of a metal capable of electrodeposition on the first and second electrodes, the ions being soluble in the electrolytic solution; and
a plurality of atoms of said metal deposited on the first or the second electrode,
such that a negative electrical potential applied to the first electrode relative to the second electrode tends to cause deposited metal to be dissolved from the second electrode into the solution and to be electrodeposited from the solution onto the first electrode,
such that a positive electrical potential applied to the first electrode relative to the second electrode tends to cause deposited metal to be dissolved from the first electrode and electrodeposited from the solution onto the second electrode,
the amount of deposited metal subsisting on the first electrode affecting the propagation of the radiation through the device.

31. An electrochemical device for reversibly controlling the propagation of electromagnetic radiation, comprising:
a first substrate which is substantially transparent to the radiation;
a first electrode which is disposed on the first substrate and which is substantially transparent to the radiation;

a second, electrically insulating substrate which is substantially transparent to the radiation;

a second, continuously electrically conducting electrode which is arranged in a mesh pattern on the second substrate;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal deposited on the first or the second electrode, such that a negative electrical potential applied to the first electrode relative to the second electrode tends to cause deposited metal to be dissolved from the second electrode into the solution and to be electrodeposited from the solution onto the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the propagation of the radiation through the device.

32. An electrochemical device for reversibly controlling the propagation of electromagnetic radiation, comprising:

a first substrate which is substantially transparent to the radiation;

a first electrode which is disposed on the first substrate and which is substantially transparent to the radiation;

a second, electrically conducting substrate which is substantially transparent to the radiation;

a second, electrically discontinuous electrode arranged in a dot matrix pattern on the second substrate and having a relatively low overvoltage for electrodeposition of the metal relative to the second substrate;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal deposited on the first or the second electrode, such that a negative electrical potential applied to the first electrode relative to the second electrode tends to cause deposited metal to be dissolved from the second electrode into the solution and to be electrodeposited from the solution onto the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the propagation of the radiation through the device.

33. An electrochemical device for reversibly controlling the propagation of electromagnetic radiation, comprising:

a first substrate which is substantially transparent to the radiation;

a first electrode which is disposed on the first substrate and which is substantially transparent to the radiation;

a second, electrically insulating substrate which is substantially transparent to the radiation;

a second electrode which is an electrically continuous grid of an electrochemically stable metal deposited on the second substrate;

an electrolytic solution disposed between and in electrical contact with the first and second electrodes;

a plurality of ions of a metal capable of electrodeposition on the first and second electrodes, the ions being soluble in the electrolytic solution; and a plurality of atoms of said metal deposited on the first or the second electrode, such that a negative electrical potential applied to the first electrode relative to the second electrode tends to cause deposited metal to be dissolved from the second electrode into the solution and to be electrodeposited from the solution onto the first electrode, and such that a positive electrical potential applied to the first electrode relative to the second electrode tends to cause deposited metal to be dissolved from the first electrode and electrodeposited from the solution onto the second electrode, the amount of deposited metal subsisting on the first electrode affecting the propagation of the radiation through the device.

* * * * *